Nov. 14, 1967 G. W. BROCK 3,353,166

OXIDE COATED MAGNETIC RECORDING MEDIUM

Filed Oct. 23, 1963 2 Sheets-Sheet 1

INVENTOR.
GEORGE W. BROCK

BY Walter J. Madden, Jr.

ATTORNEY

Nov. 14, 1967 G. W. BROCK 3,353,166

OXIDE COATED MAGNETIC RECORDING MEDIUM

Filed Oct. 23, 1963 2 Sheets-Sheet 2

United States Patent Office 3,353,166

Patented Nov. 14, 1967

3,353,166
OXIDE COATED MAGNETIC RECORDING MEDIUM

George W. Brock, San Jose, Calif., assignor to International Business Machines Corporation, New York, N.Y., a corporation of New York Filed Oct. 23, 1963, Ser. No. 318,395
6 Claims. (Cl. 340—174.1)

ABSTRACT OF THE DISCLOSURE

A magnetic recording device comprising a magnetic record member including a magnetizable material having formed in place thereon a thin protective non-magnetic oxide film of said magnetizable material forming a wear-resistant surface on said record member, and a magnetic transducer in contact with the oxide film for cooperating with said magnetizable material.

*Background of the invention*

The present invention relates to magnetic recording systems, and relates more particularly to such systems employing a transducer which is in contact with a magnetic record surface having a protective oxide coating thereon.

While the "protective coating art" is a broad and well worked one, it assumes a very special aspect when confronted with the unique and rather extreme conditions of magnetic recording media, such as magnetic disks coated with nickel, nickel-cobalt, and cobalt magnetic "memory" material. Computers can use such memory material in many forms, the nickel, nickel-cobalt, or cobalt material being coated on such non-magnetic substrates as disks, drums, tapes, strips, or stripes on paper cards or other unit records.

The problems facing the memory element designer are illustrated in the following characterization of a random access storage file for computers. In one form of random access file, magnetic disks are stacked, one above the other, and spun at about 1200 r.p.m. to be read by a magnetic head which is swiftly moved from record area to record area above the spinning disk and applies or reads data signals. This head, in one mounting configuration, "flies" a few microns above the disk surface on a thin film of air. In reality, such a head represents a flying vehicle, aerodynamically suspended on a tenuous film of air and prone, at times, to "crash" onto the spinning disk due to disk irregularities and other problems. This smashing of a disk surface by the recording head can roughen the surface, scrape away magnetic material and obliterate the record it comprises, as well as damage the recording head itself, rendering both head and disk liable to discard.

Workers in the art have attempted to solve the problems involved in the confrontation of a spinning disk with magnetic structures. Some workers have turned to "contact recording" techniques wherein the head is disposed to ride directly upon the record element in contact therewith, the magnetic record material being protected by some sort of an intermediate layer. The present invention is directed toward providing such a protective intermediate layer for magnetic records, especially in contact recording systems.

It is common knowledge that high-speed magnetic recording media have rigorous fabrication specifications, especially those of the contact recording variety. The hazards associated with the confrontation of a magnetic head with a whirling record, perhaps in contact with it, have been mentioned. They necessitate that the surface of the record have outstanding wear resistance, hardness and toughness. A record surface must be able to sustain the moderate load of a magnetic head riding over it for many millions of traversals without appreciably abrading or wearing away. The present invention provides mechanical stability for records on which a contact recording head is imposed by oxidizing the magnetic material. The resultant oxidic surface coating, as actually tested, increases wear resistance by many orders of magnitude. Where prior art contact recording disks might sustain a few hundred thousand passes with a standard head load, this invention enables such records to withstand at least 200 million passes without detectable deterioration. Coating a nickel-cobalt surface according to the invention, for instance, yielded 100 times the best prior art durability.

Unexpectedly, the invention improves durability without significantly decreasing the coefficient of friction of the surface. Long-wearing coatings have been observed to exhibit as high as 0.4 in friction coefficient. Associated with this improved wear resistance, a protective film, according to the invention, provides increased hardness.

Rubbing of a head against a record can also cause the more serious problem of "galling" wherein the head or the record member remove metal from one another, cold-welding it to one member, upsetting the surface configurations of both, and resulting in catastrophic failure of the recording elements. It will be demonstrated that an oxide film according to the invention shields the recording material and the head from one another, preventing such metal-to-metal contact and eliminating early-life galling.

Even if prior art protective coatings provided as good protection as the invention, they would still be inferior since they thin-coat inadequately. This makes them very difficult to adapt to a magnetic record, wherein the thickness of the protective coating is extremely critical because of the sensitive dependence of read-out signal with head-to-record spacing. Keeping prior art coatings as thin as a few microinches inevitably leads to poor adhesion and wear resistance, especially under head-abrasion. This illustrates that protectively coating a magnetic record presents the problem of laying down an ultra-thin (1 to 20 microinches) protective coating material which is still mechanically tough, highly adherent, and of uniform thinness. This requirement alone rules out most conventional protective coatings. It presents the dilemma of depositing enough material to cover the record sufficiently to protect it under low loads, and of not depositing even a few microinches too much less the readback characteristics be injured. The present method of providing oxide coatings from the base magnetic material, such as nickel or cobalt-bearing material, resolves this problem of thinness-control and durability. Further, it does so via a convenient process.

The problem of making an ultra-thin film adhere to a magnetic record, despite the high-speed, abrasive head riding over it millions of times, is of high concern in the art. It is, of course, no real advantage for a protective coating to have the necessary hardness, durability, abrasion resistance and thinness control, unless it also adheres perfectly to the magnetic record. Obviously, a protective coating which peels or flakes under the abrasive action of a magnetic contact recording head is no real protection at all. The oxide film produced according to the invention exhibits such superior adherence.

To achieve the above advantages and solve the prior art problems as indicated, the instant invention generally teaches a technique for oxidizing a magnetic surface, especially a nickel-cobalt bearing surface, so as to derive the prescribed ultra-thin, adherent, protective coating above the surface as well as to improve a portion therebelow. Particular success has been achieved by heating the surface in the presence of an oxidizing atmosphere such as air so as to form a thin, uniform layer on the base magnetic material, for instance, a film of nickel-oxide, cobalt-oxide or the like, on the surface as well as probable oxidation products just beneath the surface. This method is not only extremely convenient and easy to perform, but moreover is quite simple, although it had to date escaped the notice of those skilled in the art.

While it has been known in the art generally that some oxides have satisfactory wear resistance, it has never been discovered heretofore that selected oxides in accordance with this invention are superior to lubricants in wear resistance under relatively low loads. In particular, the present invention is directed to a magnetic recording system in which a lightly loaded transducer, i.e. one loaded in the range from 1 to 20 grams, rides on, and is maintained spaced from the magnetic record surface by, a thin film of oxide which has been controllably formed from the magnetic record material itself.

It is therefore an object of the present invention to provide a contact recording system for magnetic recording in which a thin protective surface layer of oxidic products derived from the magnetizable record material is employed to support and lubricate a lightly loaded transducer which cooperates with the record material.

It is a further object of the present invention to provide a contact recording system for magnetic recording in which a record material having nickel or cobalt therein is oxidized on the surface thereof to form a thin oxidic layer which supports and lubricates a lightly loaded transducer cooperating with the record material.

Still another object is to provide protective films over nickel and cobalt bearing magnetic materials to increase the wear resistance thereof under very light loads.

The foregoing and other objects, advantages and features of the invention will be apparent from the following description of preferred embodiments particularly described in the following specification, taken in conjunction with the accompanying drawings wherein.

Like other workers in the magnetic record fabrication art, the inventor had considered the problem of head-to-record wear, especially in regard to contact magnetic recording. Consider what happens when a Hy Mu 80 transducer runs in contact with a Ni-Co plated recording disk at 300"/second. Depending on the method of cleaning the disk initially, a period of smooth operation may take place after which scratching of the Ni-Co begins to occur. This will commonly persist for a few minutes until "galling" (or cold head-substrate welding) becomes visible and erratic chatter of the head upon the record begins. Eventually, the Ni-Co layer (i.e. the record material) is worn through completely and the head ploughs a furrow in the substrate destroying this portion of the record. This may take place in a few minutes or up to an hour, depending on cleanliness, suspension of head, surface finish, etc.

Turning to prior art methods for resolving this wear problem, the inventor tried many techniques without success. These methods are described below and the resultant durability is summarized in FIG. 2.

The techniques tried and eventually found inferior to the invention may generally be characterized as providing (see FIG. 2 for bars referred to):

(1) Solid layers of molybdenum disulfide ($MoS_2$) or tungsten disulfide ($WS_2$) rubbed onto the record (see bar *g*);

(2) Molybdenum disulfide plated onto the record;

(3) Molybdenum disulfide otherwise bonded to the nickel-cobalt plating;

(4) Provision of a constant molybdenum disulfide ($MoS_2$) lubricant layer by employing an $MoS_2$ pellet pressed onto the same track as the magnetic heads (see bar *h*);

(5) An overlayer of silicon monoxide evaporated onto the record (see bar *d*);

(6) Overlayers of Kanigen nickel, chromium, rhodium, and silver;

(7) Wax and fatty acids rubbed onto the record (see bars *c* and *e*); and (8) Wear resistant plastic sheaf surrounding the recording transducer (see bar *b*).

Figure 2:
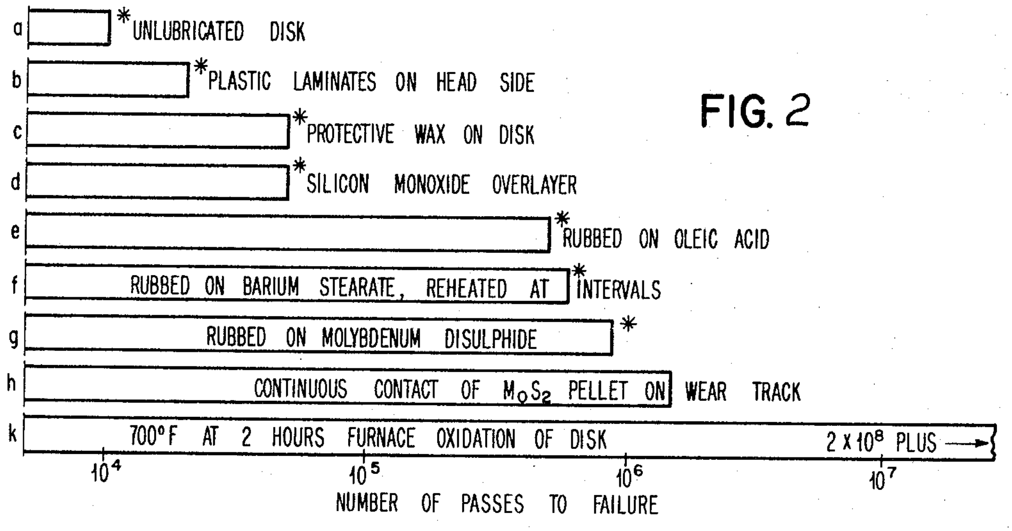
FIG. 2 is an exponential bar graph representing durability of a disk surface protected with the invention as opposed to that for other protective coatings.

In connection with FIG. 2, it should be noted that the test conditions here were constant for all lubricant systems so as to provide a reasonably good comparison of their respective wear properties under contact recording. The conditions involved a 3-gram load upon a My Mu 80 or ferrite-type magnetic recording head which was spun in contact recording relation with the surface of the disk, coated differently in each case, as indicated in the respective bar graphs, *a–k*. Bars *a–g* involved a Hy Mu 80 head while bars *h* and *k* involved the more damaging ferrite head. The point of failure was defined as 50% signal decay (readout signal of the magnetic recording material as the head passes thereover), unless an asterisk is placed beside the bar, in which case failure resulted from an actual rupturing of the nickel-cobalt material. This catastrophic failure and piercing by the head characterized most cases (bars *a–g*) not using the invention. The head was continuously run on the same track on the disk throughout each test at a speed of 300 inches per second.

The particulars of the lubricating conditions will now be described below with reference to their respective bar graphs in FIG. 2. Attention should be directed to the fact that the graphs are plotted exponentially, not linearly, and thus it will be observed that as a result of the heat oxidation form of the inventive treatment, several orders of magnitude improvement were realized over the best of the competing prior art protective techniques (bar *k* vs. bar *h*). As a "control condition" bar *a* should be noted to involve an unlubricated disk achieved only 10,000 ($10^4$) passes before it failed, failure being indicated by a rupture of the nickel-cobalt material.

The first efforts aimed at providing a surface lubricant, both solid and liquid. While considerable improvement was observed with most lubricants, the results were not good enough (bars *b, c, d, e*). The main trouble seemed to be that the poor adhesion of the lubricant to the surface resulted in its being displaced from the contact area.

The next approach was an attempt to repair damaged lubricant films. This involved rubbing barium stearate onto the surface of the Ni-Co and heating the surface of the disk with a heat lamp at periodic intervals. The object was to rediffuse the barium stearate over the disk surface and thus replace it at the wear tracks. A longer period of satisfactory operation ensued after this treatment (bar *f*), but again, it was not good or reliable enough. Rubbing a coating of $MoS_2$ did little better (bar *g*).

The first method of lubrication to achieve any measure of success (bar *h*) consisted of continuous lubrication of the wear track by spring loading a compressed pellet of molybdenum disulfide onto it. With time, the track would turn grayish, indicating transfer of $MoS_2$ onto the disk. This $MoS_2$ layer could not be removed by rubbing with tissue indicating fair adherence at least. Under high power magnification of the wear track, however, the $MoS_2$ appeared to be galled onto the disk in many discrete areas and was not a continuous film. Thus, a protective low-friction layer was being provided between the head and disk.

Defects noted in the $MoS_2$ pellet suggested smoothing the plated disk surface by reverse-plating (electro-polishing). Some extended efforts at reverse-plating, in turn, resulting in oxide formation, although it was rough and undesirable. This, in turn, suggested oxidizing the surface by another method. Such a method is the heating-in-air technique of the invention. It was found that oxidizing the disk surface by heating it at 700° F. for two hours in an air atmosphere greatly improved durability (bar *k*). This appears to prevent wear by interposing a very hard film. This film, surprisingly, need not necessarily have a reduced frictional coefficient, however. Experiments have shown that when Ni-Co plated brass disks (the results would also apply for a Ni or Co plated surface, regardless of the substrate) are heated in an air circulating furnace at 700° F. for two hours, the result is that oxides, primarily Ni-O and Co-O, are formed on the surface, having a thickness of about 1 to 2 microinches. As FIG. 2 indicates, the durability of disks thus treated, according to the invention, is on the order of at least 100 times probably much more) that of the best prior art alternative protection for contact recording (bar *h* vs. bar *k*). These tests were under actual "recording conditions" using "head-loads" (1–10 grams), making the improvement a very realistic one. The most surprising aspect of this is that where the prior art has suggested that certain oxides might increase wear resistance, but not as well as lubricants, no lubricants work as well as the invention oxide despite its increased coefficient of friction.

The inventive process will be described more particularly in the examples below, but first the following analysis of the invention in light of its tested chemical and mechanical properties.

CHEMICAL PROPERTIES

A qualitative analysis was made of the constitutents of an air-oxidized, cobalt-nickel plated surface (cf. Example I) that had exhibited improved wear characteristics under test. Electron reflection/diffraction studies yielded information about the structure of the outer-most surface film. Oxides of both cobalt and nickel were found present. Good correlation was found in identifying the low valence oxides for both cobalt (Co-O) and nickel (Ni-O). However, the presence of some higher valence cobalt-oxide was suspected. The layer particularly studied was the outer atomic layers pierced by the electron beam.

It is theorized that, generally, oxide layers formed initially consist of various oxides present on the surface in a similar mole-ratio as the metals in the original alloy. As oxidation proceeds, a stratification of layers of several oxides may occur, since the factors influencing their formation will be different. The existence of layered films of different oxides has been observed before in the art. It is possible that in the case of a binary alloy, like Co-Ni, an oxide of one of the metals may concentrate in the surface layer while an oxide of the other metal may concentrate in lower layers, perhaps in contact with the original metal surface. Interpretation of information obtained from electron diffraction micrographs is more difficult in the case of alloys than simple metals, of course. Because of the similarity of the lattice parameter in many oxides, there is some difficulty in distinguishing Ni-O from Co-O, etc. However, fitting the known reflection to the values obtained for the unknown oxides, lattice parameters were calculated for the different oxides. The best correlation was obtained for Co-O and Ni-O. The presence of one line, however, indicated the existence of some higher valence cobalt-oxides such as $Co_2O_3$ and/or $Co_3O_4$. Neither cobalt nor nickel metal was found on the surface layer, however.

It has been found that at the temperature range invalence cobalt-oxides such as $Co_2O_3$ and/or $Co_3O_4$. $Co_2O_3$, if the temperature is kept below 300° C. Although some unstable oxides of nickel exist, Ni-O is the only nickel-oxide that has been observed in the temperature range of 300° to 700° C.

Criticality of temperature uniformity to assure film thickness uniformity is indicated. Interference colors have been observed on the oxidized disk surfaces. Tests indicated that these interference colors could be attributed to oxidation layers of various thicknesses, not to layers of differing oxides. A separate experiment in heating a disk surface was made and it was found that with no temperature gradient along the substrate the colors disappeared, indicating that non-uniform heating leads to non-uniform oxide thicknesses.

Improved corrosion resistance was also found to result from the invention. Humidity tests (95% relative humidity at 100° F. for 14 days) badly attacked the untreated disk, but left it untouched when provided with the inventive film.

Figure 1:
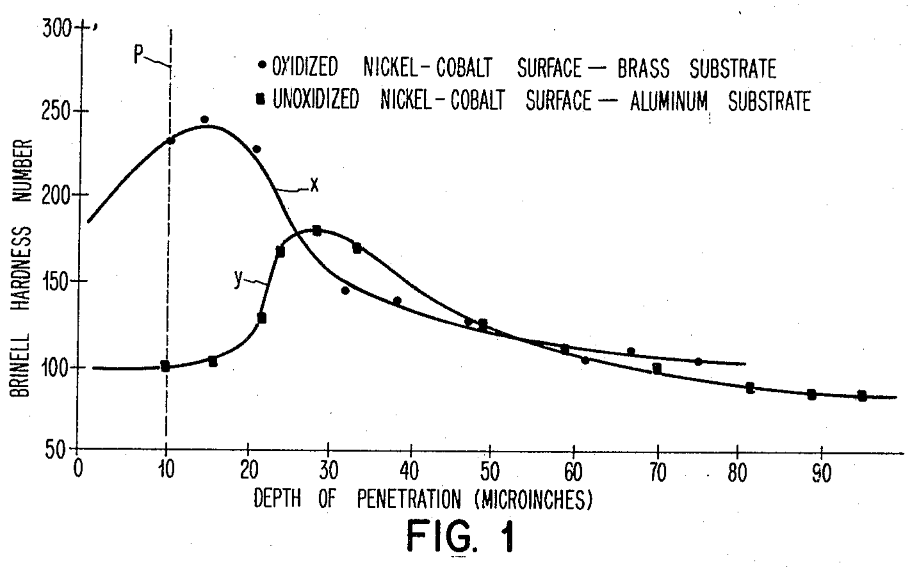
FIG. 1 is a plot of hardness profiles before and after the invention is applied.

Although the qualitative analysis above was unable to show it, it is believed that the oxidation of the cobalt-nickel bearing surfaces causes some diffusion of oxygen or oxide products into the surface, as well as a build-up of oxide upon the surface proper. This theory is supported by the observed facts that: (1) the surface is much more difficult to polish after oxidation and hence has different abrasive properties, indicating modification of its constituents; (2) if the oxidized coat is ruptured, the head still rides better on the substrate surface than it did before oxidation; and (3) the surface hardness of the oxidized surface (beneath the oxide supercoating) is roughly two to three times that prior to oxidation. This hardness improvement has been observed to extend as much as 20 microinches below the treated surface, while the oxide supercoating, as such, measures only about 2 microns thickness (cf. FIG. 1 and description therewith).

MECHANICAL PROPERTIES

Besides the above investigation of the chemical effects of the invention on the constituents of a surface, various tests were conducted to determine mechanical effects, such as changes in hardness, durability, frictional coefficient and the like. Some of these results are identical in the examples where pertinent. However, it may be enlightening to briefly mention the particulars of a few such tests.

One test investigated hardness as a function of surface penetration distance for treated and untreated surfaces. Two such surfaces are portrayed in FIG. 1; oxidized nickel-cobalt on a brass substrate (curve *x*) and unoxidized nickel-cobalt on an aluminum substrate (curve *y*). The nickel-cobalt layer was about 20 microinches thick. Since a superlayer of oxide about 2 microns thick was added for curve *x*, this must be added in this case for comparing penetration hardness to the uncoated case (curve *y*). Line P indicates such a comparison, demonstrating that the Brinell number hardness has greatly increased (about 2.5 times) as a result of the inventive treatment. Curve *x* also demonstrates that the treatment affects more than the oxide supercoating, since hardness changes are evident as deep as 20 microinches, and this goes several microinches into the magnetic material. Although the oxidation of case *x* (curve *x*) increased hardness and durability markedly, it unexpectedly also resulted in an increase in the coefficient of friction. For instance, as tested with a steel pellet sliding on the surfaces, the measured coefficient of friction was 0.33 for case *y* and 0.46 for case *x*.

Several nickel-cobalt alloys have been particularly studied to find optimum heating temperature schedules to give certain coating thicknesses. Since the thickness of the coating is a function of the time-temperature product, and since the general range of times and temperatures for most nickel-cobalt alloys will be apparent from the examples below, one may quickly arrive at a convenient optimum time-temperature schedule for a particular coating thickness upon a record surface of given constituents. Therefore, in order to aid those skilled in the art of producing nickel or cobalt-type magnetic records, to use the present invention for providing protective oxidic films on such records, the details of typical oxidizing procedures will now be described, prescribing suitable heating methods according to the invention. It will be apparent to those skilled in the art that the following examples and descriptions are not limitative but only illustrative of useful embodiments and applications of the invention as an aid to understanding and applying it.

*Example 1*

SubstrateBrass.
Record material—Ni-Co (20% Co–80% Ni) plated about 15 microinches thick.
Treatment—In air-circulating furnace for 120 min. at 700° F.
Resultant film—Ni-O, Co-O film about 2 microinches thick.
Test results—No deterioration after 200 million passes with 3.0 gram load (ferrite transducer) compared to prior art failure at 1 million passes.

A nickel-cobalt alloy was plated about 15 microinches thick onto a brass substrate to produce a contact recording disk. As Example I indicates, a thin nickel-oxide, cobalt-oxide film was rendered on the surface of this disk according to the invention by baking the disk in an air-circulating furnace for 120 minutes, keeping it at 700° F. throughout. The resultant film was found to be about 2 microinches thick after the oxidation process. The resultant oxide coated disk showed greatly improved durability in a test under the action of a ferrite magnetic head under 3 grams load, traveling at about 300 inches per second surface speed. This durability was studied on the basis of magnetic signal decay, care being taken to separate the effect of head wear from that of track wear by monitoring the signal with that on a separate track. Results of this wear test indicated that with this oxide film the magnetic readback signal was substantially undeteriorated after over 200 million passes by the head. Without such an oxide protective film and using conventional prior art protective techniques, substantial deterioration would be detected after about 1 million passes.

As an incidental benefit, it was observed that the effect of the heat treatment on the magnetic properties of the plated nickel-cobalt showed an increase in coercive force. Additionally, the film also exhibited improved corrosion resistance.

*Example II*

Substrate—Aluminum disk with copper flash.
Record material—Ni-Co (20–80) plated about 15 microinches thick.
Treatment—Anneal 120 minutes at 700° F. in air-circulating furnace.
Resultant film—Probably Ni-O, Co-O, about 1–2 microinches thick.
Test results—No deterioration after 4.3 million passes with 3.5 gram ferrite head compared to prior art failure at about 1 million passes.

As in Example I, the disk, plated with Ni-Co magnetic material, was baked in an air-circulating furnace for two hours at 700° F. The substrate was changed from brass to aluminum for comparison purposes. Generally, brass disks have been used since they are more metallurgically stable at elevated temperature. For comparison, an aluminum substrate flashed with copper and then plated with Ni-Co was heat-treated at 700° F. for two hours to see what effect this would have on the disk's appearance and geometry, and also to discover if the oxide film produced on the Ni-Co would be as wear resistant as that upon brass substrates.

For testing, information was written on the disk at 100, 500, 1000, etc. to 5000 bits per inch with a ferrite head, one-half the track being written at 3000 bits per inch to detect possible signal modulation.

Wear was followed by monitoring the track signals at intervals of time, this method being used since small amounts of disk wear alter the magnetic signal appreciably but usually cannot be resolved by a Talysurf trace. Two tracks 0.025 inch wide were written on the disk, one of the tracks was continuously worn, the other being used for monitoring purposes. Wear of the ferrite head was monitored as well by a magnifying technique accurate to less than 0.0001 inch. The test was continued for 4.3 million passes, and no alteration in signal output occurred due to track wear. No signal modulation occurred during the test. Measurements made for head wear at the end of the test indicated no change in dimensions within the accuracy of measurement (i.e., ±0.0001 inch).

Concerning the general appearance of the disk after the annealing, it was observed that little, if any, disk warpage occurred, and the color of the oxide film was blackish with a gold color at the outside edge. The outside edge showed a tendency for the Ni-Co to peel away from the aluminum, although this did not actually occur. This latter effect could probably be eliminated by lower baking temperatures of the Ni-Co plated disk. Thus, one may conclude that an aluminum substrate may be satisfactorily interchanged with the brass substrate of Example I and treated according to the invention and still derive improved wear resistance.

*Example III*

Substrate—Aluminum disk with copper flash.
Material—Kanigen plated nickel to about 200 microinches thick.
Treatment—Air-heated for 60 minutes at 750° F.
Test results—Durability increase from a few minutes to better than 17 hours.

A Kanigen plated aluminum substrate was first smoothed by heating to 600° F. for two hours, cooling and then polishing. The reason for this treatment is that, as plated, Kanigen has a rough, somewhat friable, surface. Heating at 600° F. hardens up the Kanigen and makes it more amenable to polishing.

The disk was then heated for one hour at 750° F. both to further harden it and to produce the protective oxide layer on its surface. Information was written on the disk at 1000 to 4000 bits per inch. After 17 hours' running under a ferrite head, no signal decay or surface damage was detected. Untreated Kanigen disks characteristically failed after a few minutes.

*Example IV*

Substrate—Brass disk.
Magnetic material—Electrolessly plated Co-P, about 20 microinches thick.
Treatment—Air-heated for 120 minutes at 900° F. (700° and 800° found inadequate).
Test results—Durability increase from a few minutes to over 24 hours, at least.

A brass disk plated with electroless cobalt phosphorus was first heated to 700° F. for two hours to oxidize its surface. Information was written on the surface with a ferrite head. After running a few minutes on the surface, the head galled through the track. The treatment was repeated, raising the temperature to 800° F. In testing this disk the ferrite head was completely abraded away in two minutes. The treatment was repeated raising the temperature to 900° F. At this temperature satisfactory test operation was achieved after 24 hours' wear—doubtless more was possible.

A Hy Mu 80 head was used in this case and after 24 hours' running on this track, the signal at the higher bit densities was down about 50%, whereas the lower bit densities were unaltered. Comparison of the signal with a monitor track seemed to indicate that changes in head characteristics were largely responsible for the signal decay.

As the "control" for Examples II and III, it is noted that running on non-oxidized surfaces of cobalt or Kanigen was totally unsuccessful, galling of the disk surface taking place almost immediately.

Example IV indicates the temperature criticality of the inventive process. Below 575° F. the coating was quite poor in protecting properties, evidently indicating that either the oxide supercoating was too thin, the diffused oxidation just below the surface was inadequate, or perhaps both. Conversely, at about 900°–1000° F. poor adherence and peeling were observed in the samples treated. Hence, the treating temperature must be sufficiently high to properly oxidize the given surface, yet not so high as to make the film too thick or poorly adherent.

In summary, the examples have indicated that the low-load adherence, wear resistance, hardness and corrosion resistance of cobalt or nickel bearing surfaces may be improved by thermal oxidation according to the invention wherein a specific type of heat treatment is taught. This heat treatment was prescribed in an oxidizing atmosphere, with time-temperature parameters adjusted for the particular film thickness and surface composition, the temperature being kept uniform across the surface and generally between 575° and 900° F.

Equivalent, alternative oxidizing treatments will occur to those skilled in the art, such as treatments using superheated steam, oxidizing baths and the like.

Workers in the art will recognize that the substrates used for the magnetic material are not necessarily critical and may vary widely. For instance, one might choose a non-metallic substrate on which to deposit the magnetic material using such materials as ceramics, glass, Pyroceram, nylon, plastic, Lucite, Mylar or acetate tape. Plated tape can be an especially interesting subject for wear improvement, provided its thermal limits are not exceeded. Thicknesses of the magnetic material do not appear critical either. However, the method of oxidizing (e.g. time and temperture of treatment) will depend upon the constituents of the magnetic material, as the examples indicate. While the inventive treatment has been applied only to cobalt, nickel, cobalt-nickel, and cobalt-phosphorous magnetic surfaces, workers in the art will recognize that equivalent magnetic materials may be likewise treated according to the invention, care being taken to adjust the time-temperature characteristics to accommodate the oxidizing characteristics of the materials involved.

While the invention has been particularly shown and described with reference to the preferred embodiments thereof, it will be evident to those skilled in the art that various changes in form and details, in constituents and steps, in concentration and ranges may be made without departing from the spirit and scope of the invention.

What I claim is:

1. A magnetic recording device comprising:

a magnetic record member including a magnetizable material forming a surface portion, said surface portion having formed in place thereon by an oxidizing process effected directly on the magnetizable material a thin protective oxide film of said magnetizable material, and a magnetic transducer in contact with said oxide film for cooperating with said magnetizable material.

2. Apparatus in accordance with claim 1 in which said magnetizable material includes cobalt.

3. Apparatus in accordance with claim 1 in which said oxide film is between 1 and 20 microinches thick.

4. Apparatus in accordance with claim 1 in which said transducer is urged against said oxide film by a force of between 1 and 20 grams.

5. Apparatus in accordance with claim 1 in which said magnetizable material includes nickel and cobalt and said oxide film includes oxides of nickel and cobalt.

6. Apparatus in accordance with claim 5 in which said oxide film is between 1 and 10 microinches thick and said transducer is urged toward said oxide film by a force of between 1 and 20 grams.

References Cited

UNITED STATES PATENTS

| | | | |
|---|---|---|---|
| 2,758,905 | 8/1956 | Curtis | 179—100.2 |
| 2,803,570 | 8/1957 | Hespenheide | 117—240 X |
| 3,171,754 | 3/1965 | Smaller | 117—240 X |

BERNARD KONICK, *Primary Examiner.*

A. I. NEUSTADT, *Assistant Examiner.*